(No Model.) 4 Sheets—Sheet 1.
J. NUTTALL.
MACHINE FOR CUTTING RAGS OR OTHER MATERIALS.
No. 398,273. Patented Feb. 19, 1889.
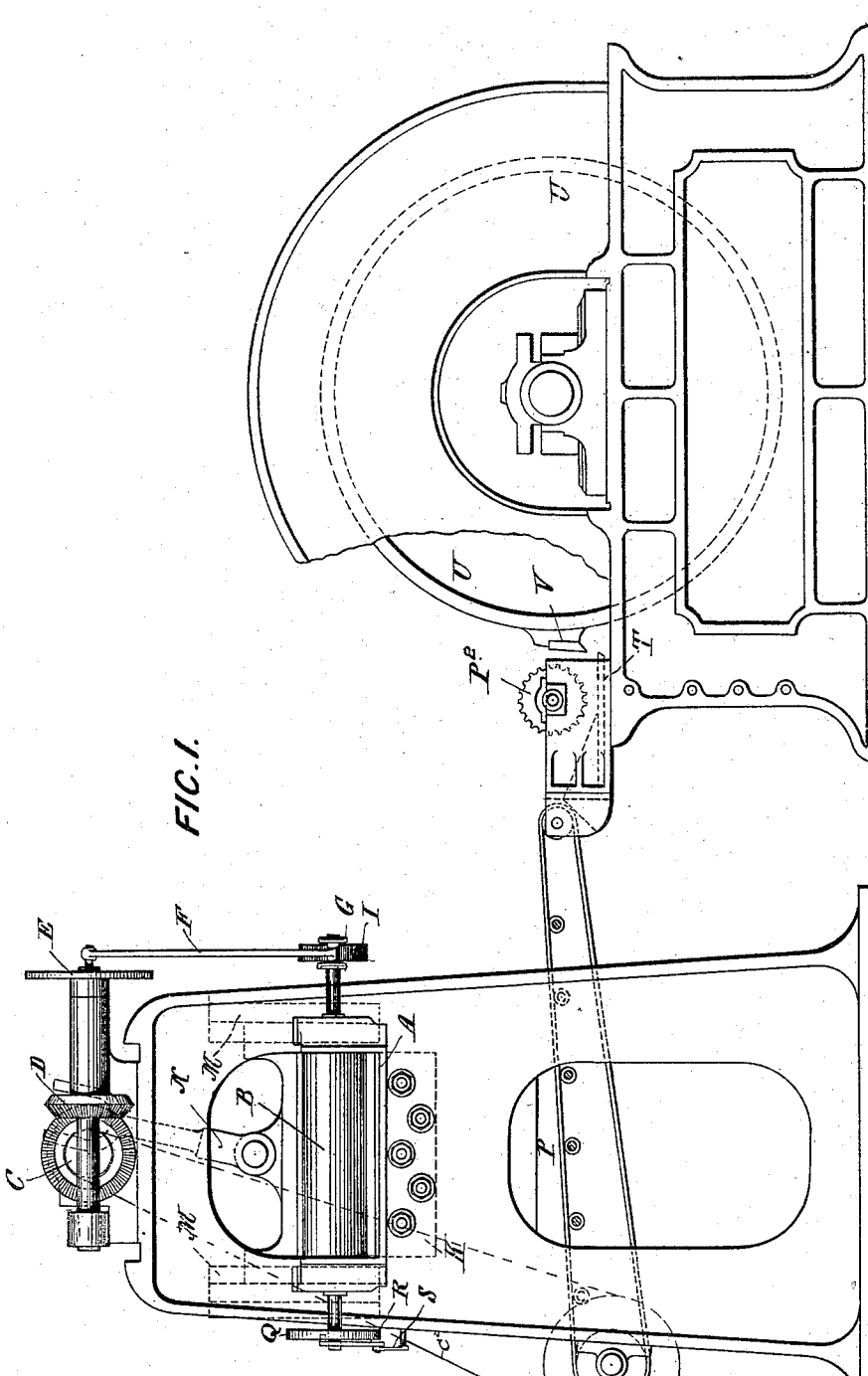
FIG. I.
WITNESSES.
Wm Chester Wells.
Rufus H. Skul
INVENTOR
James Nuttall
by his Attorneys
Howson and Howson

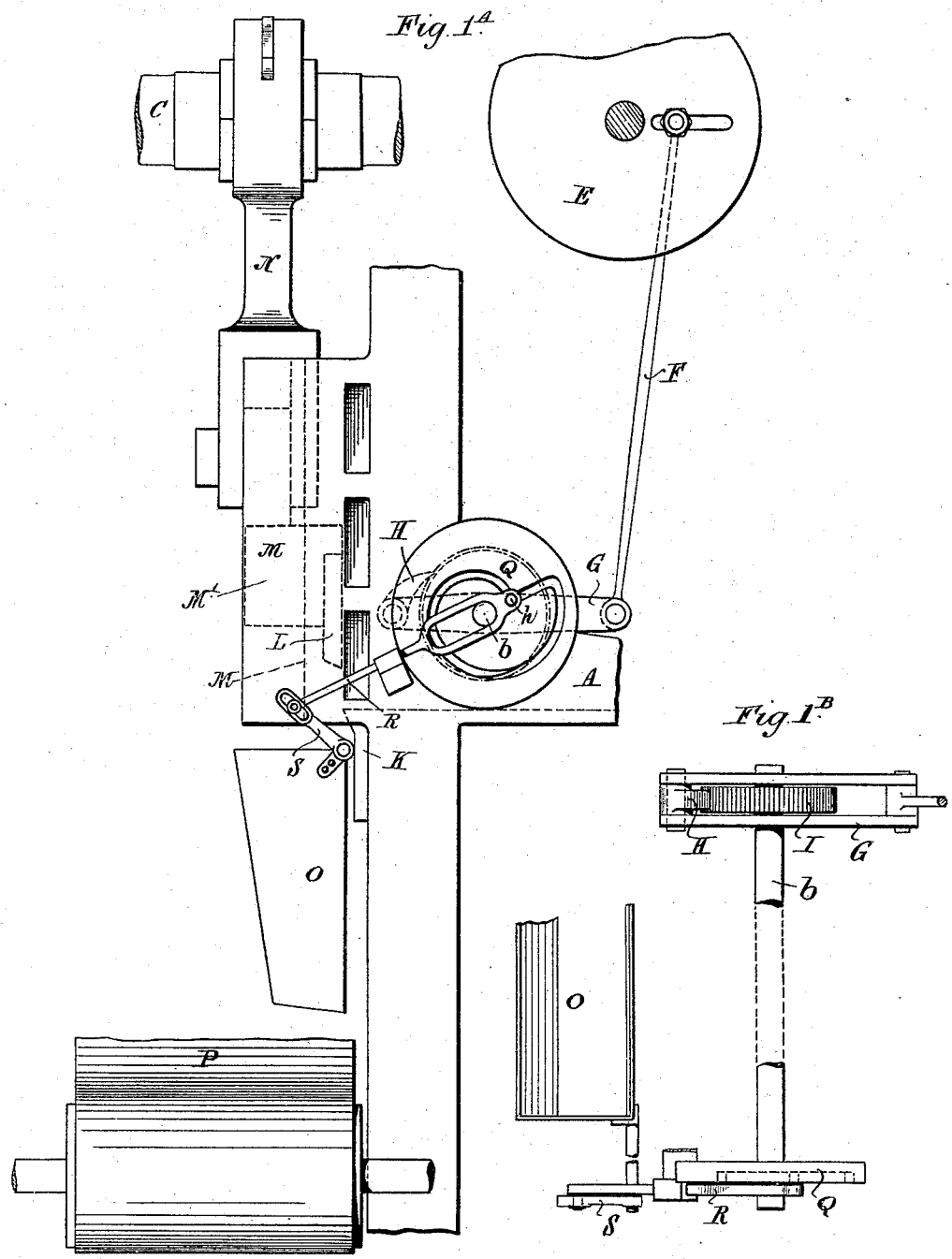

(No Model.) 4 Sheets—Sheet 3.
J. NUTTALL.
MACHINE FOR CUTTING RAGS OR OTHER MATERIALS.
No. 398,273. Patented Feb. 19, 1889.
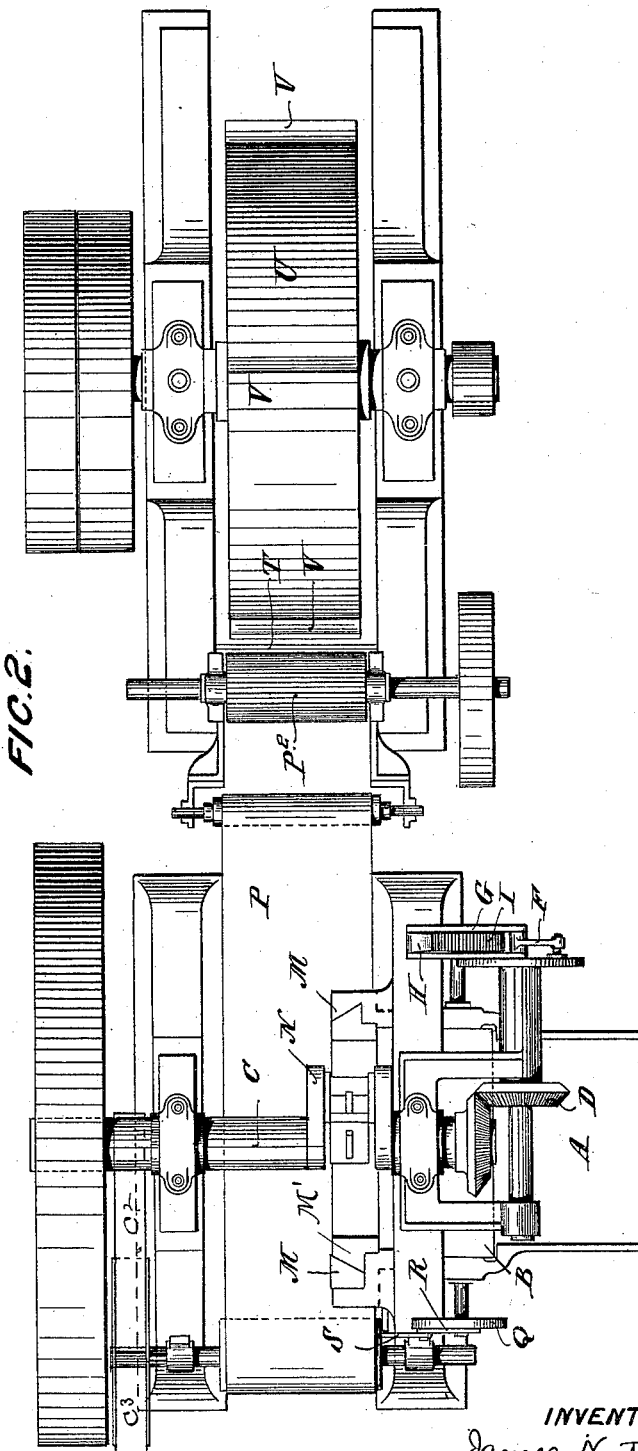
WITNESSES
Wm Chester Wells
Rufus H. Skeel
INVENTOR.
James Nuttall
by his attorneys
Howson and Howson (No Model.) 4 Sheets—Sheet 4.

J. NUTTALL.
MACHINE FOR CUTTING RAGS OR OTHER MATERIALS.

No. 398,273. Patented Feb. 19, 1889.

WITNESSES
Wm Chester Wells
Rufus H. Skeel

INVENTOR
James Nuttall
by his Attorneys
Howson and Howson

UNITED STATES PATENT OFFICE.

JAMES NUTTALL, OF BURY, COUNTY OF LANCASTER, ENGLAND.

MACHINE FOR CUTTING RAGS OR OTHER MATERIALS.

SPECIFICATION forming part of Letters Patent No. 398,273, dated February 19, 1889.

Application filed October 25, 1887. Serial No. 253,318. (No model.) Patented in England October 26, 1886, No. 13,722.

*To all whom it may concern:*

Be it known that I, JAMES NUTTALL, cashier, a subject of the Queen of Great Britain and Ireland, and residing at 15 Lord Street, Bury, in the county of Lancaster, England, have invented certain new and useful Improvements in Machines for Cutting Rags or other Materials, (for which I have obtained a patent in Great Britain, dated October 26, 1886, No. 13,722,) of which the following is a specification.

The object of my invention is to provide a machine or combination of machines for cutting rags or other materials suitable for the manufacture of paper into uniform or nearly uniform pieces of any desired size in a rapid and efficient manner.

Figure 4:
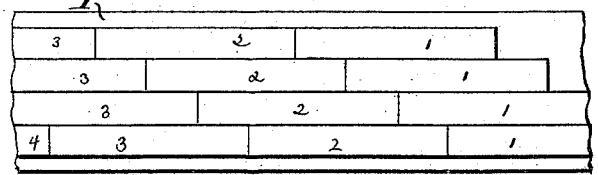
Figure 5:
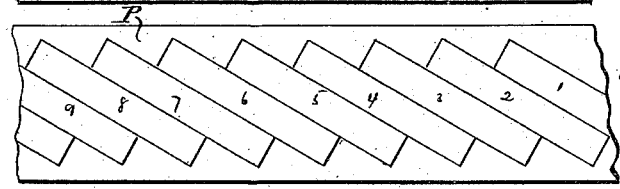

Referring to the accompanying drawings, Figure 1 is a side elevation of a machine or combination of machines constructed and arranged according to my invention; Fig. 2, a plan, and Fig. 3 an end elevation, of the same. Figs. 1$^a$ and 1$^b$ are respectively a side elevation and a plan (drawn to a larger scale) of the mechanism for conducting the strips of material cut by one cutting device onto the traveling band which carries the said strips to the cutters which cut the strips in the other direction. Fig. 4 is a plan view showing the manner in which the cut strips are deposited or arranged on the feed-belt after leaving the first cutting device. Fig. 5 is a corresponding view of a modified arrangement obtained by a modified operation of the depositing-hopper.

The rags or other materials to be cut are placed upon the feeding table or trough A, from which they are fed by the roller B up to a cutting device, by which they are cut into lengths or strips transversely to the direction of feed. The material is fed forward intermittently to the required distance by the roller B, which derives its motion from the shaft C by means of gearing-wheels D and a crank-pin on a disk, E, which crank-pin is connected by the rod F to one end of a lever, G, mounted loosely on the axle $b$ of the roller B, Fig. 1$^b$. The opposite end of the lever G carries a pawl, H, in gear with a ratchet-wheel, I, fast on the axle of the roller B. By the rotation of the crank-disk E the lever G is oscillated, so as to impart through the said pawl and the ratchet-wheel I a partial rotation to the roller B, to a greater or less extent, according to the distance at which the connecting-rod F is fixed on the disk E from its center, Fig. 1$^a$, which distance may be adjusted as required, according to the breadth of the strips to which the material is to be cut. The same effect may of course be obtained by adjusting the place of connection of the rod F with the lever G.

The cutting device, as shown in the drawings, consists of a fixed blade, K, and a vertically-reciprocating blade or guillotine, L, attached to a block, M, working in guides M', and operated from a crank on the shaft C by the connecting-rod N. Instead of the reciprocating blade L, a rotating cutting device actuated by gearing from the shaft C may be employed.

The strips of material severed by this cutting device fall onto or into a guide or hopper, O, arranged to work automatically step by step from side to side of the feed-apron or equivalent feeding device P, so that as the said hopper moves from one side to the other side of the said apron the severed strips of material are laid side by side upon the said traveling feed-apron or equivalent device P, which conducts the said strips to a second cutting device, by which they are cut crosswise.

The intermittent or step-by-step motion may be given to the hopper O by any suitable means. I have shown a suitable arrangement for this purpose consisting of a disk, Q, fast on the axle of the roller B, and provided with a cam-groove in which works a pin or roller, $h$, carried on one end of a bar or rod, R, the opposite end of which rod R is connected by a stud-and-slot connection to an arm, S, fixed on the axis on which the hopper O turns. The cam-groove in the disk Q is arranged with reference to the motions of the blade L of the cutting device, so as to impart to the hopper a forward step-by-step motion, one step after each cutting motion of the said blade, so as to bring the delivery end of the hopper into position to deposit the strips of material side by side onto the feeding-apron P. When the hopper or guide reaches the opposite side of the apron P, and has deposited a series of strips, 1, of the material across the apron, it is rapidly returned to its original position by its own weight, assisted, if required, by a spring or its equivalent, ready to receive the next series of strips 2, which it drops at the tail end of the first strips 1, as shown in Fig. 4, the apron having in the meantime traveled onward the length of the strip, and the succeeding strips 3 4, and so on, follow in rotation in the same manner during the working of the machine.

Figure 3:
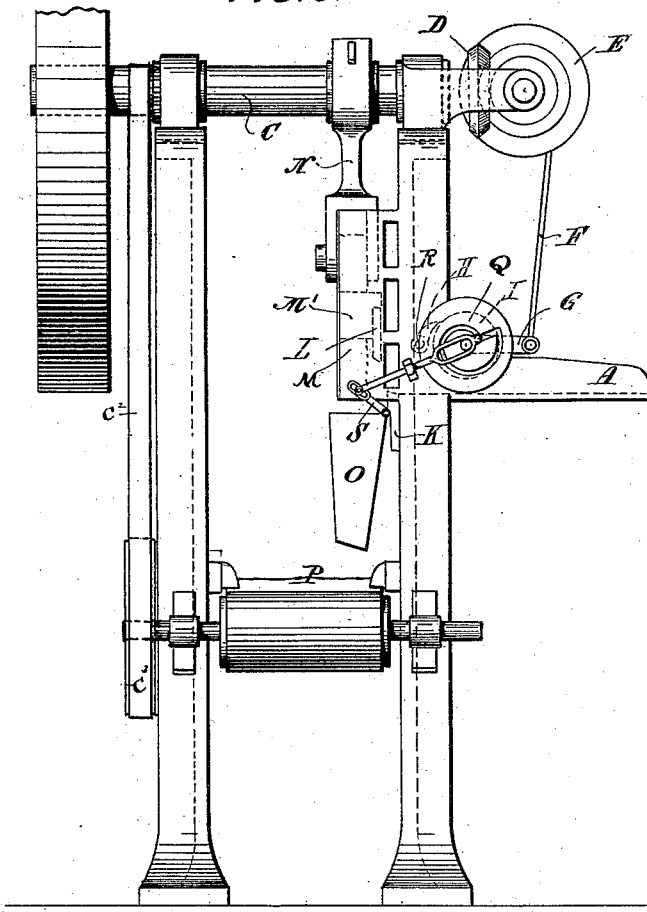

The apron P may receive its motion direct from the shaft C by means of a strap, $C^2$, and driving-pulley $C^3$, as shown in Figs. 1, 2, and 3; or it may be driven at the required speed to correspond to the motions of the hopper by independent driving mechanism, if desired. The strips of material thus deposited upon the apron or feeding device P are conducted by the said feeding device beneath a roller, $P^2$, to the second cutting device, which may consist of an arrangement similar to that hereinbefore described or as shown in the drawings. It may consist of a stationary blade, T, and a rotating drum, V, having any desired number of cutters, as at V, arranged on the periphery, which cutters, as the drum rotates, act in concert with the stationary blade T to divide transversely into the desired size the strips of material fed thereto by the roller $P^2$. The size of the pieces separated will of course depend upon the speed at which the drum V is rotated and the number of blades arranged on its circumference.

When it is desired to deposit the strips onto the feeding-apron P, so as to present them to the second cutting device at an angle, this may be accomplished by arranging the delivery end of the hopper at the desired angle the pieces are to be placed or by arranging the first cutting device at an angle to the feeding-apron P, upon which the strips 1, 2, and 3, and so on, will be deposited at the required angle, one behind another, as shown in Fig. 5.

I claim as my invention—

1. In a machine for cutting rags and other material suitable for the manufacture of paper, the combination, with the cutting-blades for dividing the material in one direction, of the hopper or receiver into which the strips of material severed by the said blades fall, mechanism for vibrating the said hopper or receiver by which they are automatically deposited side by side, a second cutting device, which divides the strips in another direction, and a feed to conduct the strips to the second cutter, substantially as described.

2. In machines for cutting rags or other materials suitable for the manufacture of paper, the combination, with the cutting-instrument for severing the material into strips, of the vibrating hopper, mechanism for moving the latter synchronously with the movement of the cutting device to deposit the cut pieces in a determined order, a traveling feed-belt on which they are deposited, and a second cutting device, which divides the strips in another direction, substantially as described.

In testimony whereof I have signed my name to this specification in the presence of two subscribing witnesses.

JAMES NUTTALL.

Witnesses:
  WM. ED. STANDRING,
    79 *Little Bridge.*
  FRANK HEATON,
    6 *Hanson St., Bury.*